W. S. PLUMMER.
VEHICLE WHEEL.
APPLICATION FILED FEB. 29, 1908.
916,009. Patented Mar. 23, 1909.
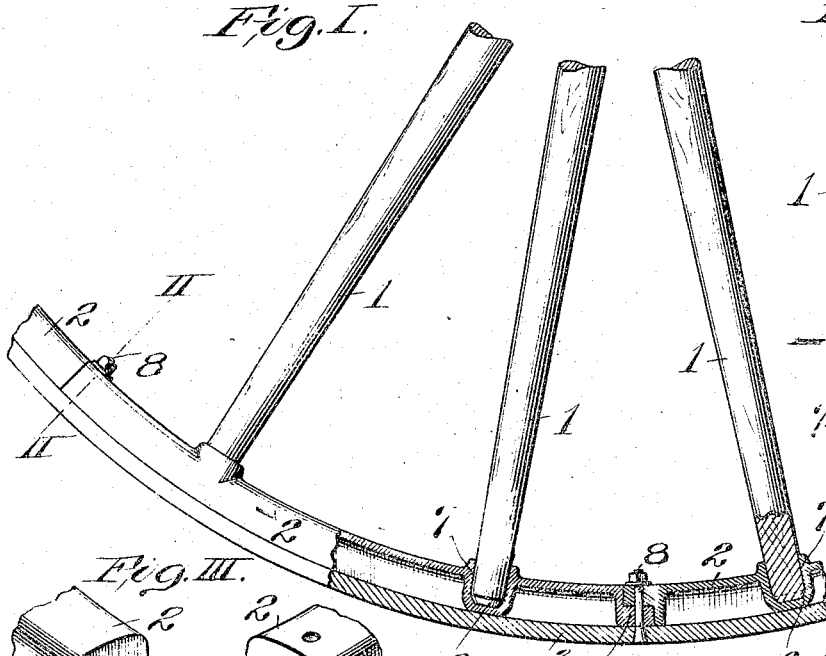
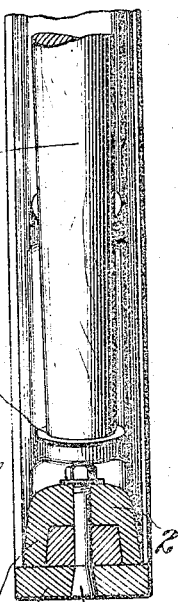
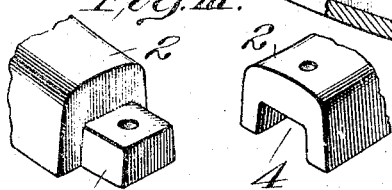
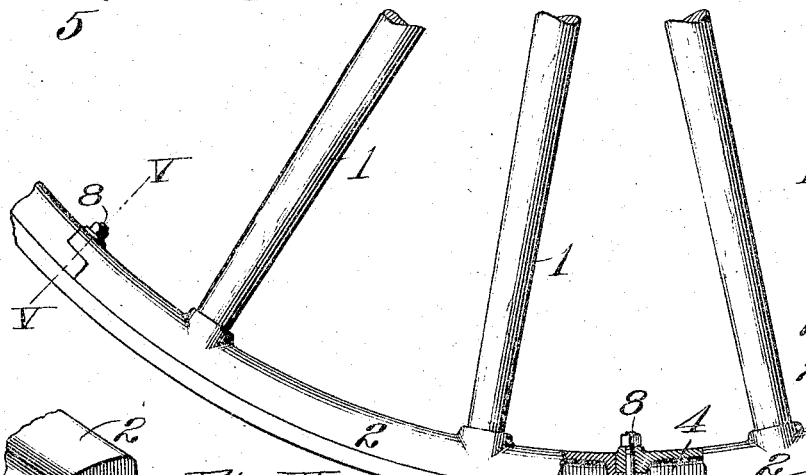
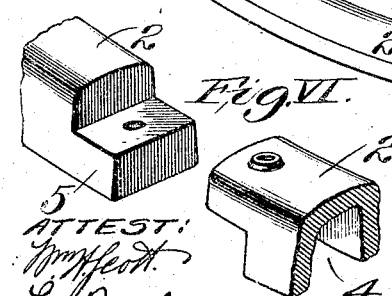
INVENTOR:
Wm. S. Plummer;
BY
ATTY.
ATTEST:
L. Rost

UNITED STATES PATENT OFFICE.

WILLIAM S. PLUMMER, OF ST. LOUIS, MISSOURI.

VEHICLE-WHEEL.

No. 916,009.	Specification of Letters Patent.	Patented March 23, 1909.

Application filed February 29, 1908. Serial No. 418,611.

*To all whom it may concern:*

Be it known that I, WILLIAM S. PLUMMER, a citizen of the United States of America, residing in the city of St. Louis and State of Missouri, have invented certain new and useful Improvements in Vehicle-Wheels, of which the following is a full, clear, and exact description, reference being had to the accompanying drawing, forming part of this specification.

My present invention relates to the class of wheels that have a felly composed of metal sections that are secured together and to the tire of the wheel, between the spokes, and in which the spokes fit in sockets formed in the felly, which sockets are sufficiently large as to make it unnecessary to reduce or chamfer the ends of the spokes An example of this class of wheels is to be found in my Patent No. 857,200 dated June 18, 1907.

My present invention consists in the particular way in which the sections of the felly are fitted and secured together and to the tire, and to the manner of forming the sockets, the object being to secure the best results at the least possible expense.

Figure I is a detailed view showing part of the outer ends of the spokes, part of the felly and part of the tire of my improved wheel. Fig. II is a section taken on line II—II, Fig. I. Fig. III is a detached, detailed, enlarged view of the interengaging ends of two sections of the felly. Figs. IV, V and VI are views corresponding to views I, II and III and showing a slight modification in the formation of the interengaging ends of two sections of the felly.

In the accompanying drawings: 1 represents the outer ends of shoulderless spokes of a wheel, 2 the felly, and 3 the tire.

The felly is composed of metal sections, the adjacent ends of which have, respectively, channels 4 and offset tongues 5 that interfit to prevent lateral movement of one section with relation to the other.

The channels. 4 preferably extend from spoke to spoke, thereby making practically a hollow felly all the way around the wheel which adds lightness and firmness to the felly. At the spokes, however, the channel of the felly is closed, as shown at 6, so that the sockets 7 in which the spokes fit are closed at their outer ends to form firm seats for the spokes. The inner ends of the sockets are also beveled so that the ends of the spokes are compressed. The ends of the sections of the felly are secured together and to the tire 3 which is seated against the sockets and the interfitted ends by means of through bolts or rivets 8, thereby making a strong permanent union between the felly and the tire as well as between the different sections of the felly.

If it becomes desirable to renew one or more spokes, the tire can be easily taken off, and the section of the felly, with which the damaged spoke connects, removed to permit the repair and if it is desired, this repair can be still more readily done by forming the felly, as shown in Figs. IV, V and VI wherein the sides of the channel 4 are cut away at the tongues 5 and the tongues are of the width of the felly and thus any section of the felly can be taken out without removing the tire.

I claim:

1. In a vehicle wheel, a felly composed of metal sections having interlocking tongues and channels, a tire surrounding the felly, and bolts connecting the felly to the tire at the overlapping points of the tongues and channels, substantially as set forth.

2. In a vehicle wheel, a felly composed of metal sections, a tire surrounding the felly, and bolts connecting the felly to the tire where the sections of the former join; said felly having sockets provided with internally beveled and closed outer ends to receive the plain shoulderless spokes of the wheel, substantially as set forth.

3. A vehicle wheel comprising a felly composed of sections each formed with an offset tongue at one end, a channel at the other end receiving the adjacent offset tongue, and intermediate sockets closed at their outer ends, a tire seated against the tongues and the closed ends of the sockets, and bolts extending through the tire, through the tongues and through the ends of the sections receiving the tongues.

4. A vehicle wheel comprising a felly composed of sections each formed with an offset tongue at one end, a channel at the other end receiving the adjacent offset tongue, and intermediate sockets beveled and closed at their outer ends, a tire seated against the tongues and the closed ends of the sockets, and bolts extending through the tire, through the tongues and through the ends of the sections receiving the tongues.

WILLIAM S. PLUMMER.

In the presence of—
 LILY RUST,
 H. G. COOK.